UNITED STATES PATENT OFFICE.

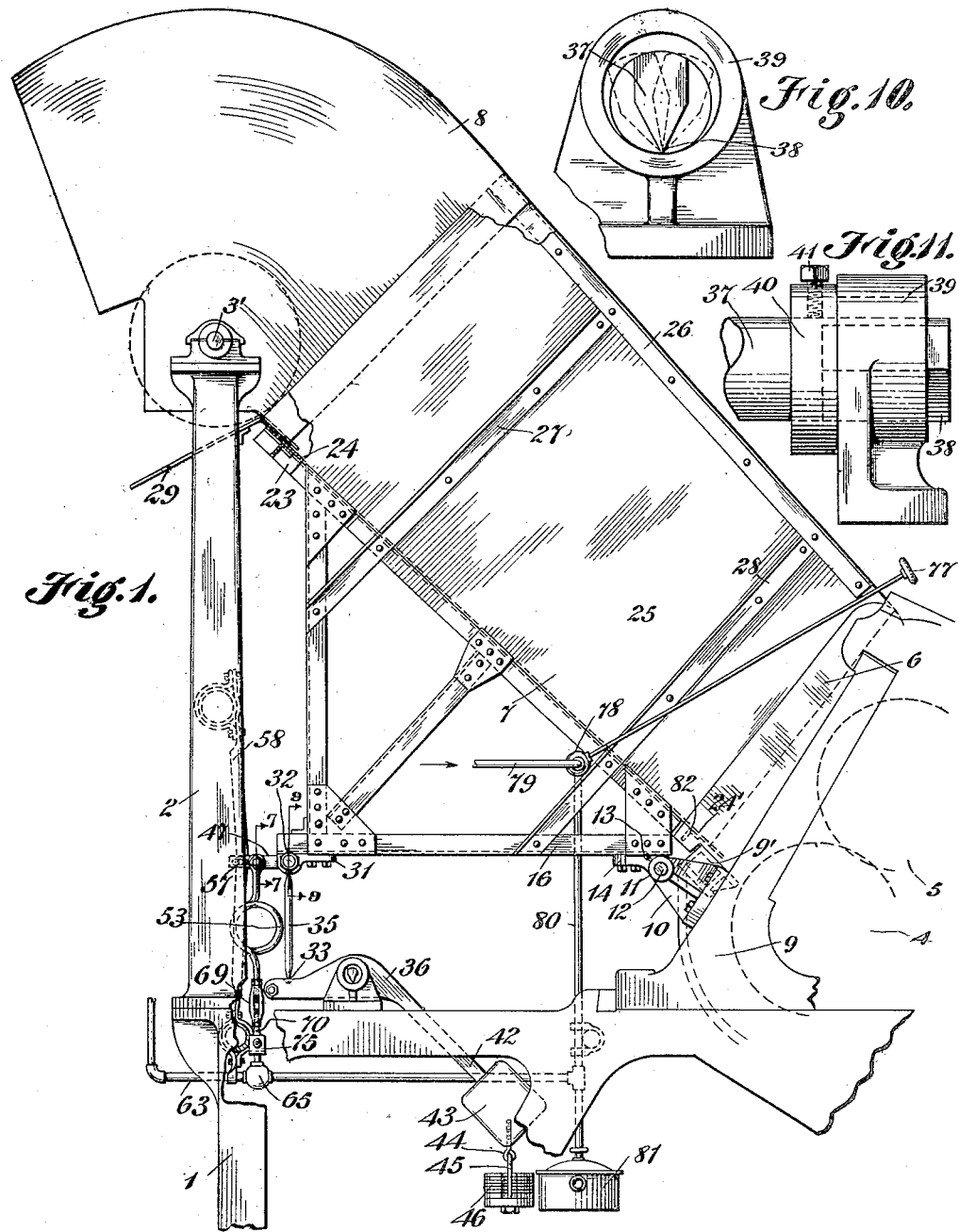

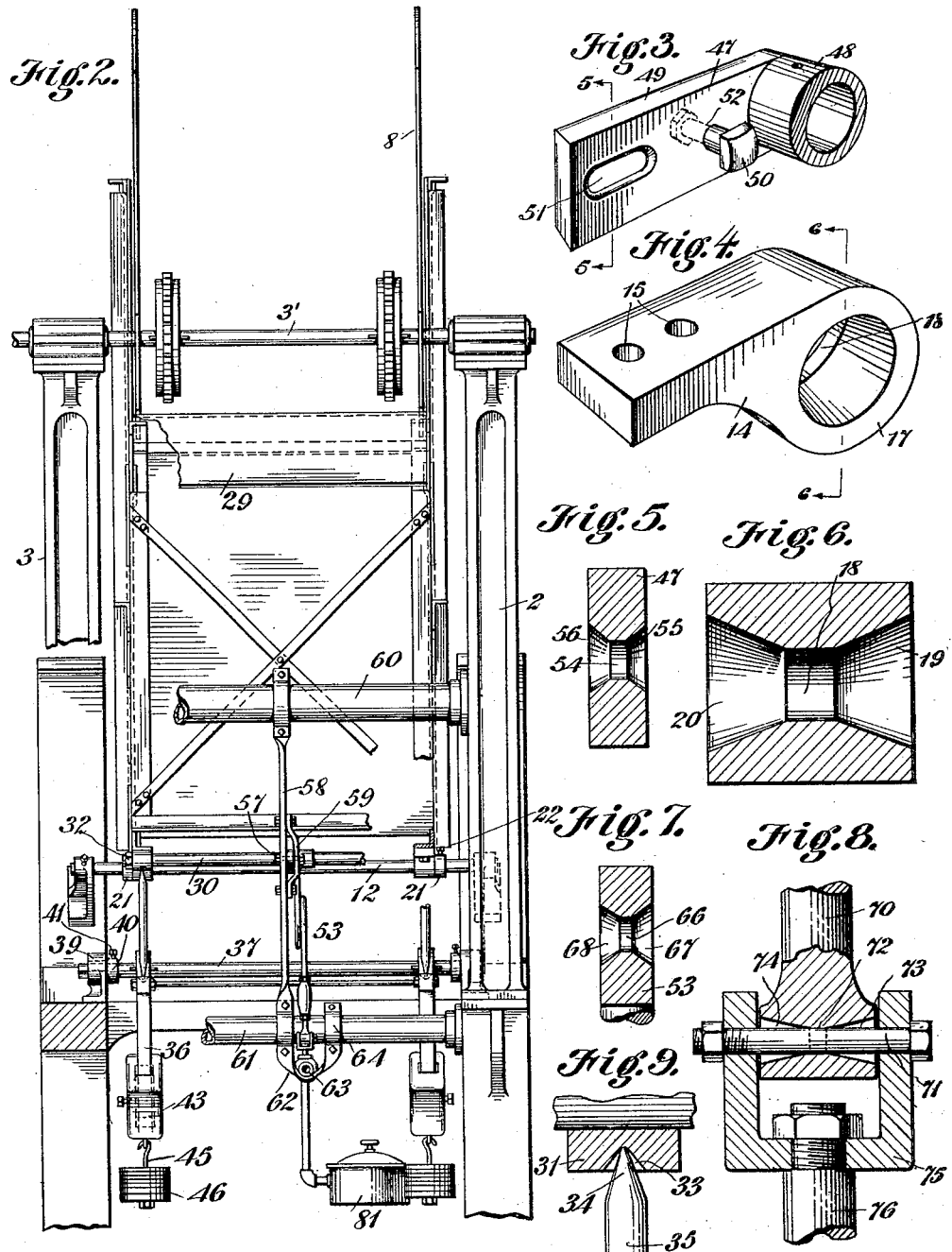

JAMES A. PIETSCH, OF NEW YORK, N. Y.

AUTOMATIC FEEDER FOR MILLS, CRUSHERS, SHREDDERS, AND THE LIKE.

1,131,414. Specification of Letters Patent. Patented Mar. 9, 1915.

Application filed March 13, 1914. Serial No. 824,408.

*To all whom it may concern:*

Be it known that I, JAMES A. PIETSCH, a citizen of the United States, and a resident of the city of New York, borough of Brooklyn, county of Kings, and State of New York, have invented a new and Improved Automatic Feeder for Mills, Crushers, Shredders, and the like, of which the following is a full, clear, and exact description.

This invention relates to improvements in feeding devices for mills, and has for an object to provide an improved arrangement, whereby the power will be controlled as the material is being fed to the rollers.

Another object of the invention is to provide an improved counterbalancing device for the chute which acts for maintaining the power turned on until the chute has received a predetermined amount of material.

A still further object of the invention is to provide a differential counterbalancing member or members, and means for connecting the same with the chute and with the power controlling valve so that when the chute is in one position the power is permitted to operate the feeding belt or carrier, and as the chute is moved to another position by the weight of the material in the chute the power is gradually turned off.

In carrying out the objects of the invention the same may be connected or associated with any form of mill, and comprises a chute for guiding the material to the mill from a lifting or elevating device or hopper and various means for supporting the chute and controlling the power to the elevator, carrier or hopper. It is to be understood that the term or expression "mill" or "mills" is to mean a mill of any desired kind, crusher, shredder or any device to which material or articles of any kind are fed.

The chute is pivotally mounted upon specially constructed bearings at one end so as to be pivotally sensitive, and is supported at the other end by a differential lever provided with weights so as to act as a counterbalance. Associated with the frame supporting the chute is a safety spring connected with the controlling valve of the steam or other power, whereby when the weights on the differential levers are overcome the safety spring will transmit the motion in order to operate the valve or other control for shutting off the power.

In the accompanying drawings—Figure 1 is a side view of a device embodying the invention; Fig. 2 is a rear view of the structure shown in Fig. 1; Fig. 3 is an enlarged detail perspective view of the safety spring supporting lever; Fig. 4 is an enlarged detail perspective view of one of the bearing brackets for supporting the chute; Fig. 5 is a section through Fig. 3 on line 5—5; Fig. 6 is a section through Fig. 4 approximately on line 6—6; Fig. 7 is a fragmentary sectional view through Fig. 1 on line 7—7; Fig. 8 is a fragmentary sectional view through a swivel connection showing certain features of the invention; Fig. 9 is an enlarged detail fragmentary sectional view through Fig. 1 approximately on line 9—9; Fig. 10 is an end view of a knife edged bearing embodying certain features of the invention; Fig. 11 is a side view of the structure shown in Fig. 10.

Referring to the accompanying drawings by numeral, 1 indicates a base or framework of any desired kind provided with suitable posts 2 and 3 to which are secured suitable journal bearings for shaft 3', and also to which certain other parts are connected. The particular construction of frame 1 and the uprights 2 and 3 may be varied without departing from the spirit of the invention as any suitable frame will answer the purpose. Arranged on the frame 1 are rollers such as 4 and 5 of any usual or preferred structure, which rollers are associated with suitable bearings and a frame of any desired structure, the same not forming any part of the present invention. Arranged adjacent the rollers 4 and 5 are entrance plates 6 which may be of the usual construction and which overlaps the chute 7. There is a slight space between the entrance plates 6 on each inner side and chute 7 so as to allow a free movement of the chute 7. This space is comparatively small, usually about one quarter of an inch in actual practice, and is designed to allow a free movement of chute 7 without allowing any of the material in the chute to pass between the chute and the entrance plates. Chute 7 overlaps the head plates 8 in a similar manner to the way the entrance plates 6 overlap chute 7. Connected with the frame 9 associated with rollers 4 and 5 are brackets 10 having bearing portions 11 on the outer part for receiving a shaft 12, which shaft is held against rotation by any desired means, as for instance set screws 13. Bearing upon this shaft are bearing members 14 shown in detail in Fig. 4, wherein it will be seen that suitable apertures 15 are provided through which retaining members, as for instance, bolts, are passed for securing the bearing members to the frame 16, which frame supports the chute 7.

The specific structure of the bearing members 14 is shown in detail in Figs. 4 and 6, wherein it will be observed that a substantially tubular shaped enlargement 17 is provided with a round central portion 18 comparatively short which rests upon the shaft or bar 12 and frusto conical shaped portions 19 and 20 which allow a slightly twisting free movement of the member 14 in order to obviate any pinching thereof against the bar or shaft 12. It will of course be evident that the bearing portion 18 could be of any length but preferably it is comparatively short in respect to the width of the member 14 in order to allow for a more or less sensitive movement of the frame 16 and chute 7. The movement of the frame 16 and chute 7 is comparatively small, and is a rocking movement. In order to keep frame 16 and chute 7 from shifting laterally or longitudinally on shaft 12 suitable collars 21 are provided which may be held in place by any desired means, as for instance set screws 22.

The frame 16 is formed preferably of angle iron but if desired may be formed of other suitable material provided the same is properly braced in order to support the chute 7 and the weight carried thereby. The chute 7 is provided with angle irons 23 which support a sheet metal bottom 24, which bottom is connected with the sides 25 of sheet metal, said sides being connected with the angle irons or bars 23, and with angle bars 26 at the upper edge of the chute, the chute being open at both ends. In order to prevent the sides from spreading, reinforcing and bracing angle irons 27 and 28 are connected with the sides, as clearly shown in Fig. 1, and are firmly bolted or riveted to angle irons 23, and to the frame 16. Arranged near the upper end of the chute 7, but not connected to it, is a stationary apron 29 supported in any suitable manner, which overlaps the bottom 24, and preferably extends a short distance beyond the head plate 8 so as to prevent any of the material in the chute from clogging or interfering with the free movement of the chute at this point. During the pivotal movement or rocking of the chute there is provided a slight separation between the bottom 24, and the apron 29, which rocking is sufficient to cause a movement of frame 16 and to actuate mechanism hereinafter fully described for controlling the power to the conveyer or elevator conveying cane or other material to chute 7. The particular construction of the conveyer or elevator depositing material in chute 7 does not form any part of the present invention, and may be of any desired type and construction. Arranged on the rear of frame 16 is a shaft 30 supported by suitable bearing members 31 fastened to frame 16 in any desired manner. Shaft 30 is fastened in position and against movement by suitable nuts 32 arranged at the ends thereof. The bearing members 31 are provided with cone bearing sockets 33 (Fig. 9) which sockets accommodate the tapering ends 34 of the bars 35. The bars 35 are tapered at each end, one end fitting into the sockets 33 in members 31 and the opposite end fitting into sockets 33 in differential levers 36. The sockets 33 and tapering ends 34 form what is sometimes known as a needle or pin bearing, and allow a substantially universal movement of the various parts and yet permit the transmission of compression from one member to the other substantially vertically of bars 35, which are normally in a vertical position. The bars 35 rest upon one end of the differential levers 36, which levers are keyed or otherwise rigidly secured to shaft 37. The ends of shaft 37 are provided with a special edge 38 slightly tapered but retaining at its most acute face part of the original curve made by the periphery of the shaft so as to act as a rolling and rocking bearing and which edges may be beveled to any desired sharpness, but preferably are left slightly rounded or arc-shaped on the operating face in order to withstand the weight brought to bear thereon. The special edged bearings 38 are mounted in suitable bearing brackets 39, which brackets are secured to frame 1 in any desired manner. Collars 40 are mounted upon shaft 37 and held rigidly in place by set screws 41 so as to prevent any longitudinal movement of shaft 37 but to allow a free pivotal movement thereof.

It is to be noted that shaft 37 rocks as the chute 7 moves while shaft 12 supporting one end of the chute is held stationary and the bearing members 14 rock on the shaft. Each of the levers 36 are provided with an inclined portion 42, and with a weight 43 to which an eye 44 is secured. The eye 44 accommodates the hooked end of bar 45, which bar carries a number of weights 46 which may be mounted on the bar and removed as desired for varying the weight on the respective levers 36. By providing levers 36 with a downwardly bent portion 42, the levers are converted into differential levers, which increase the resistance to the downward movement of bars 35 as the weights 43 and 46 are elevated, and in this manner are moved farther from the fulcrum which is at lower part of bearings 38.

Free to oscillate and mounted on shaft 30 is a spring supporting lever 47 shown in detail in Fig. 3, which lever is provided with a tubular portion 48 which acts as a bearing on the shaft, and with an arm 49 adapted to receive a bolt 50, and which is also formed with a slot 51. The bolt 50 is provided with a shoulder 52, and is held in place by a suitable nut, whereby the bolt forms a bearing for spring 53. The elongated slot 51 is constructed as shown in Fig. 5, wherein it will be seen that this slot is provided with a central bearing portion 54 and tapering or conical shaped portions 55 and 56. This provides a comparatively small bearing edge and thus obviates any pinching between the bearing pin 57 and arm 49. Bearing pin 57 may be a bolt of the usual or any desired type and is held in place by suitable nuts, as shown in Figs. 1 and 2. In order that the bearing pin 57 may have supports or journals near each end a supporting bar 58 is provided and a supporting bracket 59 is secured to bar 58 through which the pin 57 passes as well as through arm 49. Bar 58 is clamped to a suitable cross member 60 supported by the uprights 2 and 3, and held in place at the lower end by a suitable cross member 61, any desired securing means, as for instance bolts being used for clamping bar 58 in place. The lower end of the bar 58 is formed with a loop 62 which passes beneath the steam supply pipe 63 and has an end 64 clamped to the support 61 by any desired means, as for instance bolts. It will be evident that a separate stirrup or supporting strap may be provided for supporting pipe 63 instead of an extension from bar 58 without departing from the spirit of the invention. This supporting strap or stirrup is provided in order that the housing of valve 65 will not be moved downwardly when spring 53 is moved downwardly upon a downward tipping movement of chute 7. It will be observed that the arm 49 is fulcrumed at the bar 58 and free to rotate around shaft 30, so that a downward movement of frame 16 will cause the arm to rock or move pivotally about pin 57, the slot 51 allowing a proper longitudinal movement of arm 49. The upper end of the spring 53 is provided with a bearing portion 66 having conical portions 67 and 68 extending therefrom as shown in Fig. 7. Bearing portion 66 is designed to engage the pin 50 shown in detail in Fig. 3, whereby when the frame 16 and chute 7 move downwardly, pivotal pin 50 will press against spring 53 and move the same downwardly. Spring 53 is preferably provided with a single loop, though a greater number of loops may be provided if desired. The lower end of spring 53 has mounted thereon a turn buckle 69 of the screw type which is also screwed on to bar 70 (Fig. 8) which bar is pivotally mounted upon a shaft 71. The lower end of bar 70 is provided with a tubular bearing portion 72 and conical or flaring portions 73 and 74 similar to the structures shown in Figs. 5 to 7, inclusive. The shaft 71 passes through a U-shaped member or clevis 75 to which is secured the stem or operating member 76 of valve 65, the securing means being of any desired kind, as for instance, a suitable nut as shown in Fig. 8. It is to be noted that the bar 70 and the end of spring 53 are threaded into the turn-buckle 69, whereby the turn-buckle may properly adjust the respective parts, the threads on the opposite ends of the turn-buckle being of opposite hands, namely, right and left. If desired, suitable lock nuts may be provided at each end of the turn-buckle for positively preventing any independent movement thereof. The provision of this form of turn-buckle is very desirable as it allows a proper and easy adjustment of the respective parts but does not permit any loose motion between the parts. The valve 65 may be of any desired type which will open when the bar or valve member 76 is raised, and will close when said bar or valve member is lowered. The use of the spring 53 provides means whereby the valve may be readily closed but will not be broken should the chute 7 move downwardly beyond its lower limit, as the sudden shock will be taken up by the spring. It is of course to be understood that this spring is comparatively stiff so as not to be easily moved, but is sufficiently flexible to take up any excessive weight exerted thereon, and thereby relieve valve 65.

In Figs. 3 to 8, inclusive, it will be observed that at the essential points in the device special bearing structures are provided in order to make the device sensitive and yet properly support the weight at all times. Also this construction of bearing prevents any pinching or twisting of the parts in case certain of the parts get out of alinement. For instance, the bearing shown in Fig. 9 allows the parts to sway to one side to a greater or less extent, while performing its usual function of transmitting the strain from frame 16 to the levers 36.

In operation, the crushing rollers 4 and 5 are continuously operating, and cane or other material is being fed to the chute 7 more or less continuously. In feeding the material to the chute 7, sometimes an excessive amount is fed at one time, which would tend to choke the crusher or will possibly break some of the parts. In order to obviate this, it has been usual heretofore to provide an operator, who would move the handle 77 connected with the valve 78 for shutting off the power to the feeding means when an ample supply had been provided for the crusher or mill. The power, for instance, steam, passes through pipe 79, valve 78, pipe 80, pipe 63, and from thence to the driving means. When valve 78 is shut off the driving power for the feed carrier is stopped. In order to obviate the use of an operator for operating handle 77 valve 65 is provided and the various automatically operating means heretofore described are provided so as to automatically shut off the steam or other power when a predetermined amount of material has been dumped into chute 7. It will be observed that pipe 80 is provided with a suitable trap 81 of any desired structure to take care of any condensation. When using the various structures embodying the present invention the operator at lever 77 may be removed and when a predetermined amount of cane or other material has been dumped upon chute 7 the same will rock or move downwardly pivotally around shaft 12 and will close valve 65, which valve will remain closed until the weight on chute 7 has been removed to such an extent as to allow the levers 36 and weights carried thereby to raise chute 7 to a higher position, at which moment power will be turned on automatically.

In order that there may be a proper movement of chute 7 and no undue friction in continuous operation, the bottom 24 is formed with an extension 24' at the lower end which overlaps the usual casting 9' associated with the rollers 4 and 5. An angle iron 82 is provided below the extension 24' for stiffening the same. Various changes and readjustments of the device at this point may be provided without departing from the spirit of the invention, and without in any way affecting the construction and operation of spring 43, levers 36 and associated devices.

What I claim is:—

1. In a feeding device, a chute, means for pivotally supporting said chute, a differential lever for maintaining said chute in any desired position according to the weight of the material on said chute, said lever being bent adjacent its fulcrum so as to produce a normally horizontal section on one side of the fulcrum and a normally downwardly inclined section on the other side of the fulcrum, said last mentioned section being provided with a weight, and means connected with said chute for reducing the power to the feeding device when the chute is moved against the action of said lever.

2. In a feeding device, a chute, means for pivotally mounting said chute, said means comprising a supporting shaft and bearing members connected with the chute and surrounding said supporting shaft, each of said bearing members being provided with a comparatively short circular portion, and with flaring portions extending from said circular portion, means for normally holding said chute in a predetermined position, and means actuated by said chute when said first mentioned means are overcome, whereby the power for operating the feeding device is shut off.

3. An automatic feed of the character described, comprising a pivotally mounted chute, a pair of supporting bars for supporting one end of said chute, a differential lever for each of said supporting bars, means arranged on the ends of each of said differential levers for normally overbalancing said chute so as to hold the same normally in a raised position, and means connected with said chute for shutting off the power, said means being open when said chute is held in its elevated position and closed when said chute overcomes the weights on said differential levers and moves to a lowered position.

4. In an automatic feed for mills, a rocking chute, weighted differential levers for supporting one end of said chute, supporting bars arranged between said differential levers and said chute, each of said supporting bars being provided with tapered ends, each of said levers being provided with a tapered socket for receiving said tapered ends so as to allow a substantially universal pivotal movement of said bars, said chute being also provided with means formed with tapered sockets for receiving the tapered ends of said bars, and means actuated by said chute when the same moves downwardly for shutting off the power to the feeding means.

5. In an automatic feed for mills, the combination with conveying or feeding means, of a chute for receiving material from said feeding means, means for pivotally supporting said chute, a pair of differential levers for supporting the free end of said chute, a bar rigidly secured to said levers, said bar being provided with an arc-shaped edge adjacent each end, bearing members engaging said arc-shaped edges for supporting said bar, weights arranged on said differential levers, and means actuated by said chute for shutting off the power to said feeding means when said chute and its material overcomes the weights on said differential levers.

6. In a feeding device of the character described, a chute pivotally mounted at one end, a feeding mechanism for discharging material into said chute, means for normally supporting said chute at the opposite end, said means being overcome by a predetermined weight placed upon said chute, a spring pivotally connected at one end with said chute and extending substantially parallel with the line of movement of said chute, means for operating said feeding mechanism and means connected with said spring for turning off the power from said operating means.

7. In a feeding device of the character described, a pivotally mounted chute, feeding mechanism, means for operating said feeding means, said last mentioned means including a valve, yielding means for normally supporting one end of said chute, a substantially pivotally mounted arm connected with said chute, a spring pivotally connected with said arm, said spring extending substantially parallel with the direction of movement of said chute, and means for connecting said spring with said valve which controls the power to the feeding device, whereby when said chute is moved pivotally against said yielding supporting means, said valve will be closed.

8. In a feeding device of the character described, a pivotally mounted chute, feeding means, operating means for said feeding means, means for controlling the power to said operating means, means for normally supporting the free end of said chute, said means being adapted to be overcome when a predetermined weight has been placed upon said chute, an arm pivotally connected with said chute, said arm being provided with a slot, a pin extending through said slot for supporting the end of said arm, means for supporting said pin, a spring pivotally connected to said arm between said pin and the connection of said arm with said chute, and means for connecting the opposite end of said spring to that connected with said arm with said power controlling means, whereby when said chute moves downwardly said spring will be actuated for operating said power controlling means, said spring acting substantially parallel with the pivotal movement of said chute.

9. In a feeding device of the character described, a pivotally mounted chute, feeding means for said chute, means for normally holding the free end of said chute in a predetermined position, said means being adapted to be overcome by an extra weight being placed upon the chute, power operating means for the feeding means including a controlling valve, and a spring pivotally connected at one end with said chute, and at the opposite end with said valve, said spring extending substantially parallel with the pivotal movement of said chute, said spring being formed with a loop intermediate its ends so as to give a proper yielding action.

In testimony whereof I have signed my name to this specification in the presence of two subscribing witnesses.

JAMES A. PIETSCH.

Witnesses:
A. L. KITCHIN,
PHILIP D. ROLLHAUS.

Copies of this patent may be obtained for five cents each, by addressing the "Commissioner of Patents, Washington, D. C."